US010633915B2

(12) United States Patent
Samanta et al.

(10) Patent No.: US 10,633,915 B2
(45) Date of Patent: Apr. 28, 2020

(54) SELF SUPPORTING AREOGEL INSULATION (71) Applicant: Cabot Corporation, Boston, MA (US)

(72) Inventors: Susnata Samanta, Medford, MA (US); Chitrabala Subramanian, Belmont, MA (US); Peter F. Pescatore, Wakefield, MA (US); Wendy E. Pryce Lewis, Lexington, MA (US); Rajendran R. Chary, Sudbury, MA (US)

(73) Assignee: Cabot Corporation, Boston, MA (US)

( * ) Notice: Subject to any disclaimer, the term of this patent is extended or adjusted under 35 U.S.C. 154(b) by 284 days.

(21) Appl. No.: 15/104,656

(22) PCT Filed: Nov. 21, 2014

(86) PCT No.: PCT/US2014/066774
§ 371 (c)(1),
(2) Date: Jun. 15, 2016

(87) PCT Pub. No.: WO2015/094575
PCT Pub. Date: Jun. 25, 2015

(65) Prior Publication Data
US 2016/0319588 A1 Nov. 3, 2016

Related U.S. Application Data (60) Provisional application No. 61/918,517, filed on Dec. 19, 2013.

(51) Int. Cl.
| E06B 3/67 | (2006.01) |
| C01B 33/159 | (2006.01) |
| B32B 7/12 | (2006.01) |
| B32B 5/16 | (2006.01) |
| B32B 17/06 | (2006.01) |
| B01J 13/00 | (2006.01) |
| C01B 33/14 | (2006.01) |

(52) U.S. Cl.
CPC ......... *E06B 3/6715* (2013.01); *B01J 13/0056* (2013.01); *B32B 5/16* (2013.01);
(Continued)

(58) Field of Classification Search
CPC ......... E06B 3/6715; Y02B 80/22; B32B 5/16; B32B 7/12; B32B 2307/412;
(Continued)

(56) References Cited

U.S. PATENT DOCUMENTS

| 5,128,181 A * | 7/1992 | Kunert | E04B 1/74 |
| | | | 428/34 |
| 8,557,356 B2 * | 10/2013 | Colson | E04C 2/54 |
| | | | 428/34 |
| 2006/0125158 A1 * | 6/2006 | Rouanet | B32B 5/02 |
| | | | 264/621 |

(Continued)

FOREIGN PATENT DOCUMENTS

| EP | 2799409 A1 | 11/2014 | |
| EP | 2884149 A1 * | 6/2015 | ............. C04B 26/06 |

(Continued)

OTHER PUBLICATIONS

Database WPI, Week 201414, Thomson Scientific, London, GB, AN2014-D02648, XP-002735838.
The International Search Report and the Written Opinion of the International Searching Authority, or the Declaration of International Patent Application No. PCT/US2014/066774, dated Mar. 12, 2015.

*Primary Examiner* — Donald J Loney (57) ABSTRACT

A self-supporting aerogel structure is provided. The structure comprises a plurality of aerogel particles adhered together with an adhesive to produce a material exhibiting low heat transfer and high transmission of visible light. The aerogel particles can be coated with a polymer or prepolymer and remain free flowing until they are activated to complete polymerization.

11 Claims, 3 Drawing Sheets

(52) U.S. Cl.
CPC .............. *B32B 7/12* (2013.01); *B32B 17/068* (2013.01); *B32B 17/069* (2013.01); *C01B 33/14* (2013.01); *C01B 33/159* (2013.01); *B32B 2255/04* (2013.01); *B32B 2255/26* (2013.01); *B32B 2307/302* (2013.01); *B32B 2307/304* (2013.01); *B32B 2307/412* (2013.01); *B32B 2307/414* (2013.01); *C01P 2004/61* (2013.01); *Y02A 30/251* (2018.01); *Y02B 80/26* (2013.01)

(58) Field of Classification Search
CPC .......... B32B 2307/414; B32B 2307/304; B01J 13/0056; C01B 33/14; C01B 33/159; Y02A 30/251
See application file for complete search history.

(56) References Cited

U.S. PATENT DOCUMENTS

| | | | |
|---|---|---|---|
| 2012/0097907 A1* | 4/2012 | Bauer | ................... C04B 14/064 252/602 |
| 2016/0003402 A1 | 1/2016 | Hidaka et al. | |
| 2016/0010786 A1 | 1/2016 | Hidaka et al. | |

FOREIGN PATENT DOCUMENTS

| | | |
|---|---|---|
| WO | WO 2005/033432 A1 | 4/2005 |
| WO | WO 2008/144634 A2 | 11/2008 |
| WO | WO 2012/078739 A2 | 6/2012 |
| WO | WO 2014/024482 A1 | 2/2014 |
| WO | WO 2014/150310 A1 | 9/2014 |

* cited by examiner

FIG. 2C

SELF SUPPORTING AEROGEL INSULATION

RELATED APPLICATIONS

This application is a national phase application of PCT/US2014/066774, filed on Nov. 21, 2014, which claims priority under 35 U.S.C. § 119(e) to U.S. provisional application Ser. No. 61/918,517, filed Dec. 19, 2013. Both applications are incorporated herein by reference.

FIELD OF THE DISCLOSURE

The present disclosure relates to aerogels and in particular to the use of aerogels in insulative, translucent materials.

BACKGROUND

Aerogels, and in particular silica aerogels, exhibit low density and low thermal conductivity making them useful as insulative materials. Aerogels also allow for the passage of light making them useful in fields where both high thermal insulation and high light translucency are appreciated. Aerogels can be formed by removing solvent from hydrogels, such as through supercritical drying techniques or via solvent substitution combined with ambient pressure drying.

SUMMARY

In one aspect, an insulated glass unit is provided, the IGU comprising a self-supporting structure of aerogel particles between two opposed panes of transparent or translucent material, the structure having a thickness of at least 5 mm and a planar surface area of at least one half the surface area of one of the panes, an adhesive coating the aerogel particles and adhering adjacent particles together, wherein the structure exhibits thermal conductivity of less than 28 mW/mK at an average temperature of 37.5 degrees Celsius and average light absorbance of less than 80% at 400, 450 and 650 nm. In some embodiments, the structure can have a thickness of greater than 1 cm. Light absorbance or any light refraction may not vary in a discernible pattern in the IGU. The polymer may be present at 5% to 50% by weight based on the weight of the aerogel particles. The IGU may include at least one scrim between the structure of aerogel particles and one of the panes and may exhibit no discernible settling of the aerogel particles after shaking at 15.7 m/s² for 4 hours.

In another aspect, a method of making a freestanding aerogel structure is provided, the method comprising coating a plurality of aerogel particles with a polymer or pre-polymer, forming the aerogel particles into the shape of the structure, and activating the polymer or pre-polymer to adhere adjacent aerogel particles together to produce the aerogel structure wherein the structure exhibits thermal conductivity of less than 28 mW/mK at an average temperature of 37.5 degrees Celsius. The method can include drying the aerogel particles after coating the particles with the polymer or pre-polymer, and/or coating the plurality of aerogel particles by coating the aerogel particles with an aqueous treatment vehicle. The particles can be coated after being placed between the two panes of transparent or translucent material. The method can include densifying the aerogel particles prior to activating the polymer or pre-polymer. Activation can occur by applying heat. The aerogel particles can be placed between two panes of transparent material and the polymer or pre-polymer activated in situ to produce a translucent window. The polymer or pre-polymer may not enter the pores of the aerogel particles by more than 20% by volume. The aerogel particles, polymer and any scrim can fill greater than 95% of the volume between the two panes of transparent material. The method can include transferring the aerogel structure into a volume between two sheets of translucent or transparent material to produce an insulated translucent window. The method may use aerogel particles having an average diameter of less than 2 mm and greater than 0.5 mm.

In another aspect, a self-supporting structure comprising aerogel particles and an adhesive is provided, the structure having thermal conductivity of less than 28 mW/mK at an average temperature of 37.5 degrees Celsius and average light absorbance of less than 80% at 400, 450 and 650 nm, wherein the structure has a length, width and thickness and the ratio of length to thickness is greater than 100:1. The structure can exhibit an average light absorbance of less than 90% at 400, 450 and 650 nm. The adhesive can be a polymer and can comprise less than 50% by weight of the structure. The structure can consist essentially of aerogel particles and one or more adhesives and may include a scrim that can be adhered to aerogel particles. The aerogel particles can be silica aerogel particles and may exhibit an average particle diameter of less than 4 mm, or all the particles may have a diameter of less than 4 mm.

DETAILED DESCRIPTION

In one aspect, an aerogel structure is provided that is made from a plurality of aerogel particles that have been adhered together. The structure may be translucent and can be used in daylighting applications such as insulated glass units (IGUs). The individual aerogel particles can be coated with an adhesive such as a polymer, dried, and can be free flowing to facilitate later manipulation. After the particles are packed into the shape of the desired structure, the adhesive can be activated to fix the aerogel particles in place and produce a structure that is free standing and will not settle during transportation or use.

The most common aerogels are formed of either alumina or silica. Silica aerogels in particular possess a number of properties that make them a good choice for thermal insulation. For instance, these aerogels are typically light and exhibit very low thermal conductivity. Silica aerogels can be made or rendered hydrophobic and these hydrophobic silica aerogels are resistant to moisture and may be useful in some insulating applications without additional treatment. Aerogel particles may be used in a loose unbound form, or may be bound together by an adhesive, a network of fibers, a substrate or additional materials. Aerogel particles have been used to provide thermal insulation in IGUs, but it has been found that the particles settle over time, resulting in empty spaces and bulging areas in the window. Attempts to cure these issues have included, for example, supporting the aerogel particles in a honeycomb like structure retained between panes of glass. This method, however, possesses drawbacks such as increased heat transmission and uneven transmission of visible light. For example, discernible light patterns formed by the honeycomb structure can be undesirable in many applications. A structure is considered to exhibit a discernible pattern of light refraction if a human, upon observing light passing through the structure, can see repeating units of greater than 2 mm. For example, an IGU composed of aerogel particles held in position by a repeating 1 cm honeycomb support or a 1 cm by 1 cm grid support would exhibit a discernible light pattern as a result of the difference in refractive index between the support material and the aerogel particles. An IGU filled with only aerogel particles having an average particle size of 1 mm would not exhibit a discernible light pattern.

In one aspect, aerogel particles are adhered together to form a stable structure that can be used, for example, in an IGU. The IGU may include two opposed panes of translucent or transparent material, and in some cases may include third or fourth panes placed between the two opposed panes. Voids may be formed between adjacent panes, and aerogel particles may be used to fill some or all of these voids. The particles can comprise silica based aerogel and include a mixture of sizes and shapes. The aerogels can have narrow or wide particle size distributions and can be in the form of comminuted powders or larger chunks. Aerogel particles can be in the shape of spheres, although the aerogel particles can have any shape. The diameter of an aerogel particle is measured along the longest cross sectional line in a given particle. The larger pieces can have a diameter of from about 1 mm to sizes approaching the thickness of the inner thickness of the IGU. The average aerogel particle diameter may be less than about 4.0 mm, less than about 1.0 mm, less than about 0.5 mm or less than about 0.2 mm. In some embodiments, the range of average particle diameters is 0.01 mm to 1 mm, 0.7 to 1.2 mm, or 0.05 mm to 0.9 mm. In some embodiments, all the aerogel particles may have a diameter of less than 4.0 mm, less than 2.0 mm, less than 1.0 mm or less than 0.5 mm. In other embodiments, the structure may be essentially free of particles having diameters of greater than 0.2 mm, greater than 0.5 mm, greater than 1.0 mm or greater than 2.0 mm. Aerogel particles may have an aspect ratio (longest dimension to shortest dimension), for example, of less than or equal to about 1, 1.1, 1.5, 2.0, 2.5 or 3. Aspect ratios may also be greater than 1.5, greater than 2 or greater than 3.

Any type of aerogel particle(s) can be used to make the structures described herein. The aerogel particles can be based on metal oxides that are suitable for a sol-gel technique (C. J. Brinker, G. W. Scherer, Sol-Gel Science. 1990, Chaps. 2 and 3), such as Si or Al compounds, or those based on organic substances that are suitable for the sol-gel technique, such as melamine-formaldehyde condensates (U.S. Pat. No. 5,086,085) or resorcinol-formaldehyde condensates (U.S. Pat. No. 4,873,218). Suitable aerogels can be made from waterglass or from organic materials such as TEOS and TMOS. They can also be based on mixtures of the above-mentioned materials. In many embodiments, aerogels containing silicon (Si) compounds and, more preferably, $SiO_2$ are used. Hydrophobic aerogels are those exhibiting a water contact angle of greater than 90 degrees. Examples include, but are not limited to, aerogels commercially available from Cabot Corporation. Particular commercially available types include, but are not limited to, LUMIRA® aerogels.

In one set of embodiments, aerogel particles with porosities of greater than about 60% and densities of less than about 0.4 g/cc can be used. In other embodiments, aerogel particles may have densities of from about 0.05 to about 0.15 g/cc. The thermal conductivity of the aerogel particles can be less than about 40 mW/m° K, less than about 25 mW/m° K, or from about 12 mW/m° K to about 18 mW/m° K, or lower.

In one set of embodiments, the aerogels may be translucent. Translucent means that greater than 10% of visible light can pass through an object but that images are not defined as they would be with a transparent object. A transparent material is translucent but a translucent material need not be transparent. Translucent aerogels that also provide good insulative properties may be useful in applications such as daylighting, including insulated glass units (IGU). Measuring light transmission through a structure can be done using methods known to those of skill in the art. For example, the translucency of a structure or IGU can be measured using ASHRAE method 74-1988. In different embodiments, the aerogel particle structures described herein may exhibit light transmission of greater than 5%, greater than 20%, greater than 50% or greater than 75% at a path length of 1 inch.

The self-supporting structures described herein may exhibit any shape and proportion useful in providing an insulated translucent system. In many embodiments, the structures are substantially planar and dimensioned to fit between two sheets of translucent material to form an IGU. As used herein, substantially planar means that the structure includes a major plane (typically two opposed major planes) that is planar except for peaks and valleys that result from aerogel particles (coated or uncoated) extending above or below the surface of the structure. These peaks and valleys may be, for example, less than or greater than about 0.1 mm, 0.3 mm or 0.5 in height or depth. The structure may have a length, width and thickness, and the length and width are typically a factor of at least 10× or at least 100× the thickness. The length and width may be equal or the length may exceed the width by a factor of greater than 2× or 3×. Although the thickness of the structure may vary across the length and width, in many embodiments the thickness is constant and does not vary by more than about 10% across the length and width of the structure. The "planar surface area" of an aerogel particle structure is the surface area calculated by multiplying the length and width of the structure and does not include surface area attributed to individual particles and pores.

In many embodiments, a plurality of aerogel particles are held together in a structure using an adhesive such as a polymer. The particles can be coated with the adhesive prior to forming the structure, and the coated particles may be independent and free-flowing prior to adhesive activation, e.g., polymerization or drying. The coating may completely cover a particle or may cover one or more portions of a particle or group of particles. The thickness of the coating may be greater on some portions of the particle than on others. In many embodiments, the coating covers some or all of the outer surface of the particle without intruding into the pores of the particles. In some embodiments, coated particles may be mixed with uncoated particles. The coating may be a polymer or a pre-polymer and may be a mixture of materials. As used herein, a pre-polymer is a compound or mixture that is polymerizable but has not yet been fully polymerized. Pre-polymers include both monomers and oligomers. In some embodiments, the adhesive may be applied by coating the particles with a neat adhesive, with a solution of adhesive in a liquid carrier, a dispersion of adhesive in a liquid carrier or an emulsion of an adhesive in a liquid carrier. The adhesive or a combination of the adhesive and a carrier, including any additives, is referred to as a treatment vehicle. The treatment vehicle can be an aqueous or non-aqueous system. As used herein, an aqueous fluid is a liquid that contains greater than 10% water by weight, and an aqueous treatment vehicle is a treatment vehicle in which the liquid component of the vehicle contains at least 10% water by weight.

In many embodiments the aerogel structure can be rigid. As used herein, an aerogel structure is rigid if it cannot be bent around a four inch diameter cylinder without cracking the structure. If the structure can be bent without cracking, it is a non-rigid or flexible structure. In some embodiments, the structure may consist essentially of aerogel particles and one or more adhesives and may be void of additional materials such as fibers, pigments and/or opacifiers. In another set of embodiments, the aerogel structure may consist essentially of aerogel particles, one or more adhesives and one or more scrims. A translucent scrim may be adhered to at least a portion of a substantially planar surface of the structure and in some embodiments can provide support to the structure. In other instances, a scrim can be free floating in relation to the aerogel structure and does not contribute to support. In many embodiments the aerogel structure is self-supporting based only on the adhesion between particles that is provided by an adhesive such as a polymer resin.

One of the reasons that aerogels can provide low thermal conductivity is the porosity of the aerogel particles. In the past, coating aerogel particles with a polymer has been found to fill, or partially fill, many of the pores, causing an increase in heat conduction. For instance, polymers in a melt state or in a non-aqueous system have been found to intrude pores and increase heat transfer. It has been found that the use of a treatment vehicle that is substantially incompatible with the surface of the aerogel can coat the aerogel particle without causing the polymer to enter the pores. For instance, in the case where a particle has been hydrophobically surface treated, a polar, aqueous system can provide a coating of adhesive without substantial pore intrusion and without a significant increase in heat conductivity. For example, in some embodiments less than 10%, less than 20%, less than 30% or less than 50% of the pore volume may be filled with polymer. The amount of pore intrusion may be determined by using microscopy or other methods known to those of skill in the art. Adhesive polymers can be applied to the aerogel particles in quantities that are adequate for adhering the particles together without adversely affecting insulation quality or light transmission more than necessary. In some embodiments, the amount of adhesive to aerogel, on a weight to weight basis, can be in ranges from 5% to 40%, 5% to 30%, 5% to 25%, 5% to 20% or 10% to 20%. The polymer, or prepolymer, can be dissolved, dispersed, or emulsified in a liquid carrier in concentrations of less than 50%, less than 40%, 5% to 30%, 5% to 20%, 1% to 10% or 1% to 5%. Molecular weights of select polymers can range from 500 to 100,000,000 Daltons or 10,000 to 100,000 Daltons.

Adhesive polymers, and the carriers they are dissolved or suspended in, can be selected, in some embodiments, based on the wettability of the aerogel surface with respect to the treatment vehicle. The aerogel/treatment vehicle interface can exhibit a degree of wettability that is adequate to fully wet the surface of the aerogel particle but may not be so wettable that the polymer is able to wet the interior surfaces of the aerogel pores. Wettablity can be adjusted, for example, by varying the concentration and/or type of polymer, the type of solvent, by including additives such as wetting agents and/or surfactants, or by choosing aerogel particles with different levels or types of hydrophobic treatment.

In one aspect, a structure of particles may be held together by an adhesive that can be organic or inorganic. For example, the adhesive may be a polymer, a pre-polymer or waterglass. In one set of embodiments, an adhesive is selected from polymers that are soluble, dispersible or can be emulsified in an aqueous carrier. The polymers or pre-polymers may include groups that help render the polymers or pre-polymers water compatible, such as hydroxyl, carboxylic acid or ester functional groups. Specific types of polymers include fluoropolymers, acrylics, polyurethanes, polyvinyl alcohols, polyvinyl pyrrolidones, water glass and colloidal silica. When applied to an aerogel particle, the adhesive may form a coating on the particle that does not adhere particles together until a secondary action is taken. For example, the adhesive may need to be cured by drying, applying heat, or applying radiation in order to fix the particles in a structure. In some embodiments, the adhesive may form a solid or gel on the surface of the aerogel particles at low or room temperatures (25° C.) but may start to flow at higher temperatures prior to polymerization. In this manner, after coated particles have been packed together, the adhesive can flow from a particle surface and concentrate at points of contact with a second or third particle. Thus, a particle having an even coating of adhesive over its entire surface may have more than 50% of that adhesive concentrated at points of contact after the adhesive has been allowed to flow. This may provide for a reduction in the amount of adhesive used compared to the amount used if the adhesive remained evenly distribute across the surface of each particle. In some cases, a stack of aerogel particles, or an IGU filled with aerogel particles, may be subjected to a temperature above the glass transition point of the adhesive, or above the melting point of the adhesive, prior to fixing the aerogel particles into a structure, e.g., by polymerizing the adhesive. In some embodiments, suitable polymers may include acrylics such as Acrygen 8596, polyvinyl alcohols such as Kuraray 21-205 and polyurethanes such as Dispercoll U53. Mixtures of different polymers can also be used.

In additional embodiments, adhesives may be used that have a refractive index that is close to the refractive index of the aerogel particles. For example, the adhesive may have a refractive index that is less than 1.8, less than 1.5, less than 1.4 or less than 1.3. The difference in refractive index between the aerogel particles and the adhesive may be, for example, less than 50%, less than 30%, less than 20% or less than 10%. The adhesives used may also contain additives that can help to improve rheological, heat transfer, or optical characteristics. For example, an adhesive may be mixed with hollow glass microbeads or small particles of aerogel to reduce the heat transfer through the adhesive.

Polymer adhesives and/or treatment vehicles can be applied to aerogel particles in any number of ways that are capable of coating the particles. These methods include, for example, mixing aerogel particles into a treatment vehicle, forming a slurry of aerogel particles in a treatment vehicle, spray coating the aerogel particles with an adhesive or treatment vehicle, dry mixing the aerogel particles with an adhesive polymer, or reacting polymer precursors in the presence of aerogel particles to form polymers directly on the aerogel particle surface. In one set of embodiments, aerogel particles can be dropped from a hopper and sprayed with a treatment vehicle as they pass through the air.

In one set of embodiments untreated aerogel particles can be treated using a batch process. The adhesive treatment vehicle, in any of these systems, can be sprayed onto the particles or the particles may be mixed directly with the adhesive or a solution or dispersion of the adhesive. Upon application of adhesive, particles may be mixed to distribute the adhesive. For example, the particles may be tumbled, shaken or vibrated to distribute the adhesive coating. In one embodiment, aerogel particles can be coated and then mixed with untreated particles to distribute adhesive between all of the particles. In another embodiment, treated aerogel particles can be mixed with untreated aerogel particles and the adhesive can be retained on the treated particles without being transferred to the untreated particles.

In another set of embodiments, aerogel particles can be treated on a continuous basis. For example, a continuous stream of aerogel particles can be sprayed with an adhesive or a treatment vehicle. Aerogel particles can be sprayed in free fall, such as from a hopper, or may be sprayed while moving along a conveyor or in a fluidized bed. In a continuous process, mixing and distribution of adhesive can take place during the coating process as the particles may be continuously moving in relation to each other. In one embodiment, aerogel particles are mixed with a fluid containing an adhesive and are in constant movement as the particles are dried. This can help to dry particles without adhering coated particles together and the dried particles can remain free-flowing after any liquid carrier has been removed or essentially removed.

In another embodiment, adhesive can be applied to a scrim that is, in turn, adhered to particles that may be coated or uncoated. The particles can be adhered to the scrim before or after the scrim and particles are placed between two or more translucent layers to form an IGU. The scrim may be coated on one side with an adhesive or a treatment vehicle. Aerogel particles can then be placed in contact with the scrim, and the adhesive can be activated by, for example, drying, adding a catalyst, or irradiating with catalytic radiation such as UV. In one specific embodiment, one or two scrims can be coated with aerogel particles in this manner, and then additional coated or uncoated particles can be filled into a space between two particle coated scrims that are in contact with opposed edges of the translucent panes of an IGU. The particles that are adhered to the scrims may be sufficient to prevent substantial settling of the loose particles that are in the central portion of the IGU, even when the centrally located aerogel particles are not coated with adhesive. This set of embodiments may also allow for a reduced level of adhesive on the particles that are retained in the central portion of the IGU. For example, particles in the central portion may be coated with less than 50% (wt/area) of the amount of adhesive that is coated either on the scrim(s) or on an outer layer(s) of aerogel particles. At these reduced coating levels the particles in the central portion of the IGU may not be coated sufficiently to render the resulting structure self-supporting scrim, all of the particles can be supported to an extent where noticeable settling is avoided.

After aerogel particles have been treated with a treatment vehicle, the particles can be dried to remove liquid carrier and/or to make the particles free-flowing. For example, a dried particle may have all or most of the liquid carrier removed and may contain, for example, less than 5%, less than 2% or less than 1% liquid carrier by weight. The liquid carrier can be aqueous or non-aqueous and may be water. In different embodiments, particles can be dried before or after they are shaped into a structure or placed between panes of an IGU. Aerogel particles may be dried at atmospheric pressure or under vacuum. Aerogel particles can be heated close to or above the boiling point of the liquid carrier. Heat may be applied, for example, by placing the treated aerogel particles in an oven, applying infrared radiation, applying steam, microwave radiation or by passing a hot gas, such as air, over or through a bed of particles. The aerogel particles may be stationary or moving when they are dried, and in some cases may pass along a ventilated conveyor that can flow warm or hot gas through the bed of particles at a rate adequate to dry them without forcing them from the conveyor. In other embodiments, a fluidized bed can be formed where particles are in constant motion as warm or hot gas passes through or over the bed. In many embodiments, when the aerogel particles have been dried (>99% by wt of carrier solvent removed) they are free flowing and have no tendency to stick together. In other embodiments, the particles may retain some tackiness although large clumps of particles are generally avoided. Examples of suitable drying temperatures include greater than 25° C., greater than or equal to 50° C., greater than 75° C., or greater than 100° C.

In one set of embodiments, untreated aerogel particles may be placed between the panes of an IGU prior to be treated with an adhesive. The aerogel particles may be, for example, placed, poured or vacuumed into the void between panes, and can then be densified using the methods described herein. A treatment vehicle including an adhesive can then be fed into the IGU and flowed around and over the aerogel particles that are in place. The amount of treatment vehicle added may be a fixed amount based on the amount of aerogel present as well as on the desired loading level. In one embodiment, the treatment vehicle can be flowed horizontally or vertically through the IGU until excess treatment vehicle is received from an opposing open end of the IGU. In this manner, all or most of the aerogel particles will be coated with the treatment vehicle, and the desired loading of the aerogel particles can be chosen by selecting a specific concentration of adhesive in the treatment vehicle rather than by a specific amount of treatment vehicle. The adhesive can then be activated by using the methods described herein, such as via radiation or heat via an oven or hot air flow. Scrims, such as hydrophobic scrims, can be used during the process to prevent treatment vehicle from contacting the transparent panes. Alternatively, the panes may be hydrophobically (or hydrophilicly) treated so that treatment vehicle does not adhere to the interior surfaces of the panes.

Figure 1:
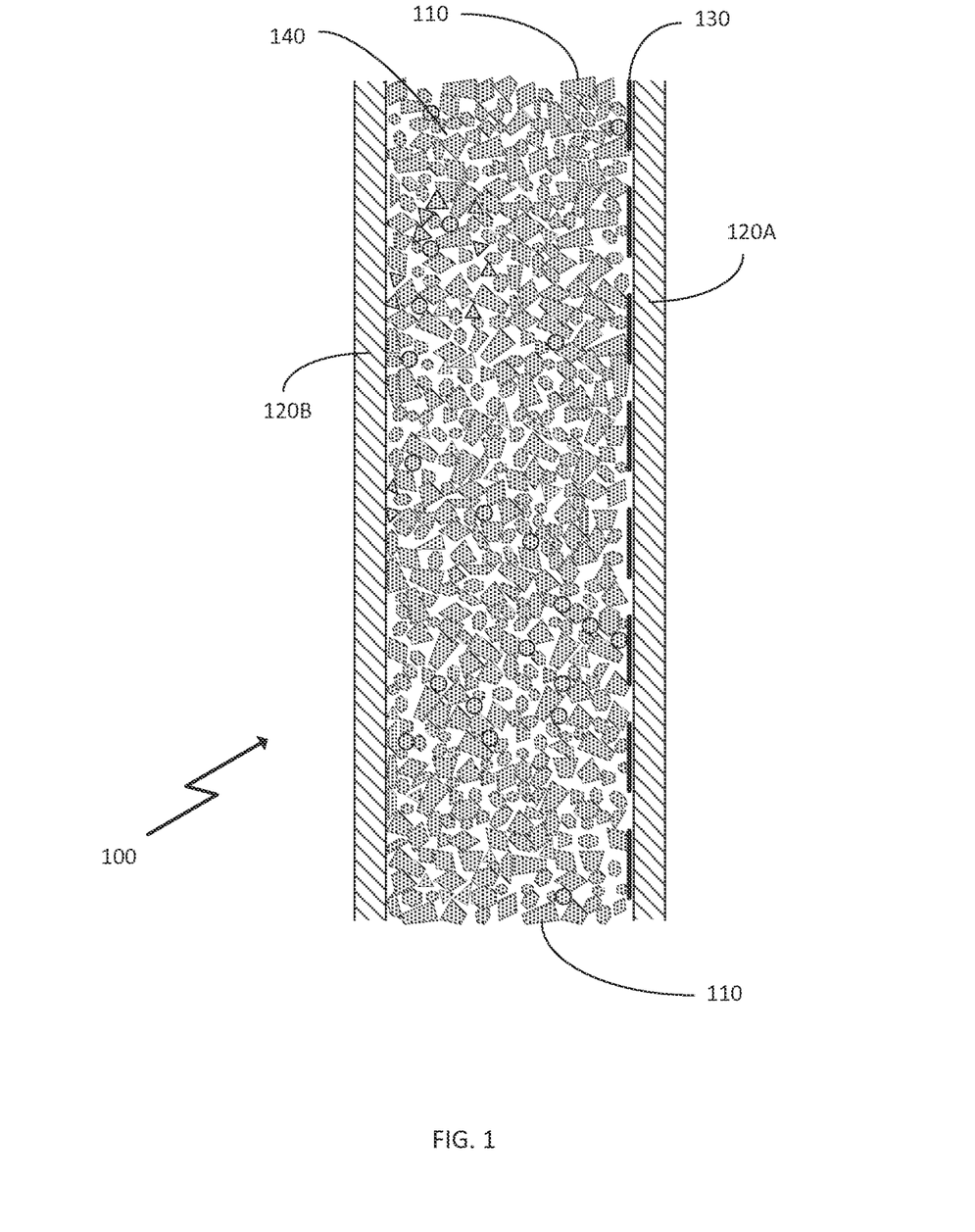
FIG. 1 provides a schematic depiction of a cross section of an embodiment of an IGU including a structure of adhered aerogel particles.

In one aspect, aerogel particles can be adhered together between two panes to form an IGU core that can be used in applications benefitting from excellent thermal insulation and visible light translucency. In one set of embodiments, a plurality of aerogel particles can be fused together to form an insulating core for IGU 100 as illustrated in FIG. 1. Coated aerogel particles 110 may be of different sizes and shapes. After application of an adhesive, the particles are dried so that they become free flowing and are unattached. The particles can be poured, pumped or vacuumed into a void between glass panes 120A and 120B. Panes 120A and 120B may be a fixed distance apart and may be oriented vertically, horizontally or at any angle in between. The panes may be transparent or translucent. After the void between the panes has been filled with coated aerogel particles, the particles may be packed to densify the amount of aerogel in the space. Densification may increase the volume of coated particles in between the panes so that the particles (including pore volume) consume greater than 80%, greater than 90% or greater than 95% of the volume of the space between panes 120A and 120B. The remaining space may be filled with a gas, such as air or dry nitrogen or a noble gas, or may be vacuum. The mass of densified aerogel particles may exhibit a density of from about 50 to about 200 kg/m$^3$.

Densification may be aided by a number of techniques including, for example, pressing, vibration, suction, ultrasound, or a combination thereof. The IGU may also be rotated during the densification, in a vertical plane for example, to, for example, reduce potential separation of small and large sized particles. As the aerogel particles are densified, additional aerogel particles can be added to fill newly formed space. The IGU may also be fitted with an extension at one of the open ends of the IGU to hold additional aerogel particles that automatically feed into the void between the panes as space appears due to densification. In another embodiment, opposed panes of an IGU may be forced or held apart so that the distance between the panes is greater than in the finished IGU. While the panes are apart, the void between the panes can be filled with coated and/or uncoated aerogel particles. This allows the IGU to be "overfilled" and can allow for automatic compaction of aerogel particles when the panes are allowed to return to their natural, closer positions. If desired, the aerogel particles can then be dried and/or the coating can be cured to form a structure of adhered aerogel particles in the IGU.

Scrim 130 is shown between the aerogel particles and the inner surface of pane 120A. A similar or different scrim may also be used against the inner surface of pane 120B. Scrim 130 may cover all or a portion of the area of pane 120A. The scrim can help to provide diffusion of light and can provide a layer between adhesive covered aerogel particles 110 and pane 120A. In this manner, aerogel particles do not adhere directly to pane 120A. By providing separation between the aerogel particles and pane 120A, the scrim can also improve optical qualities that might otherwise provide a mottled look at points where aerogel particles contact the pane. The scrim can also isolate the aerogel particle structure from panes 120A and 120B so that any movement or expansion of the panes does not affect the aerogel structure. Scrims may be placed inside an IGU prior to the addition of aerogel particles, but may also be attached to the aerogel particles prior to insertion in the IGU. Scrims may be coated with an adhesive before or after insertion into an IGU. Scrims may be made of a variety of translucent or transparent materials and may be woven or non-woven materials. Scrim material may also be chosen to minimize or maximize surface tension with a treatment vehicle. For example, if an aqueous treatment vehicle is used, the scrim may be hydrophilic in order to promote spreading of adhesive across the scrim. In another embodiment using an aqueous treatment vehicle, the scrim may be hydrophobic in order to restrict the spreading of the treatment vehicle across the scrim. Scrim 130 can be free floating, can be attached to the aerogel particle structure, or can be attached to pane 120A, for example, with an adhesive or with mechanical clips. If the scrims are adhered to the aerogel particles, the entire structure consisting of scrim and adhered particles may be free floating in relation to the panes. Scrims are available in a variety of thicknesses and may be, for example, between 10 and 40 g/m$^2$. Examples include nonwoven glass scrims such as Adfors glass veils GD5510/A15 and Siveils Pearlveil.

After the void between the panes is filled and the aerogel particles have attained a desired packing density, the adhesive may be activated to adhere the particles together in a structure. Adhesion can be achieved by activating the polymer or pre-polymer via heat, radiation or catalyst, for example, to induce polymerization. Heat can be supplied, for example, by an oven, by hot gas flow through the IGU or by microwave or infrared radiation. The temperature obtained should be adequate to bring about adhesion, for example by polymerization of a coating, of adjacent coated aerogel particles. In some embodiments, a temperature of greater than 100° C., greater than 125° C., greater than 150° C. or greater than 200° C. may be used to activate the polymer. Not all points of contact between particles need to be adhered, but the adhesion level throughout should be adequate so that the resulting structure is self-supporting in the absence of panes 120A and 120B. This means that the aerogel particles will not settle during normal shipment or use, and will not settle during routine thermal expansion and contraction of panes 120A and 120B. The structure can be self-supporting even when scrims are removed from the structure. For example, an aerogel particle structure having dimensions of 10 cm by 10 cm by 1 cm can be self-supporting when standing on edge, with or without adhered scrims. In many cases, the particles become non free-flowing particles and will be adhered to one another even in the absence of a scrim or after the scrim has been peeled from the structure.

Figure 2A:
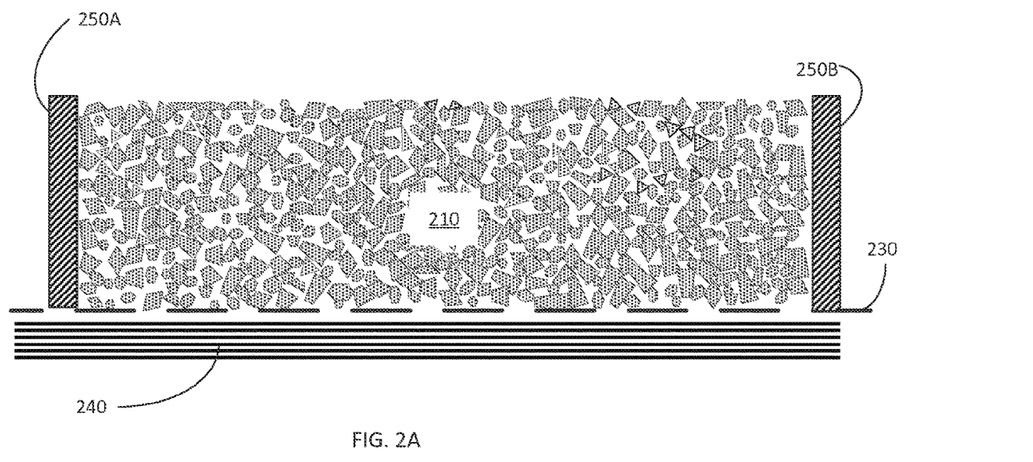
FIG. 2A provides a cross sectional drawing of one stage of the production of an embodiment of an aerogel structure.
Figure 2B:
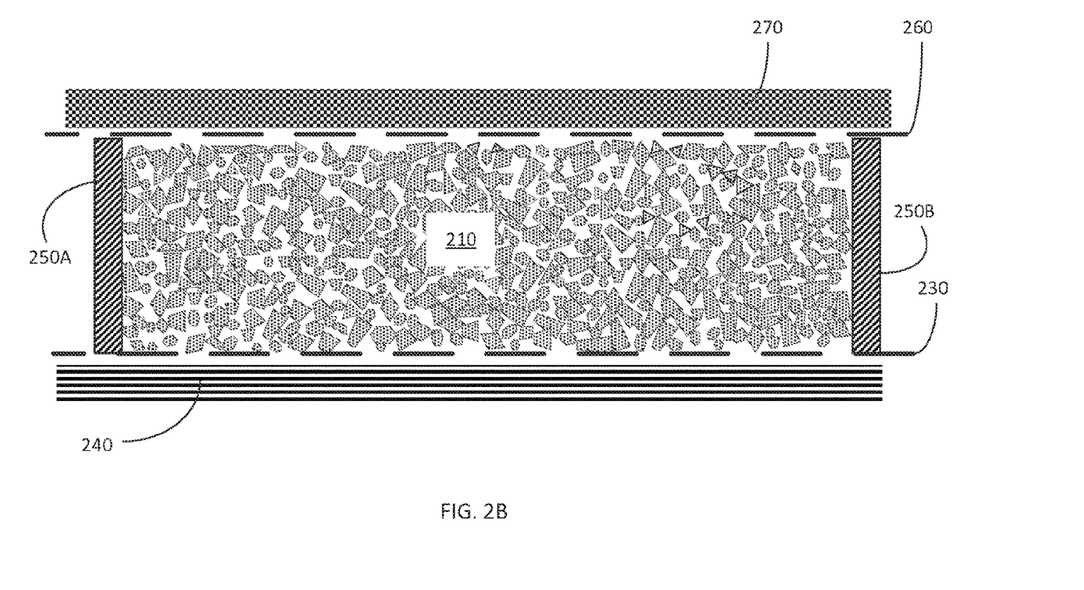
FIG. 2B provides a cross sectional drawing of a second stage of the production of an embodiment of an aerogel structure.
Figure 2C:
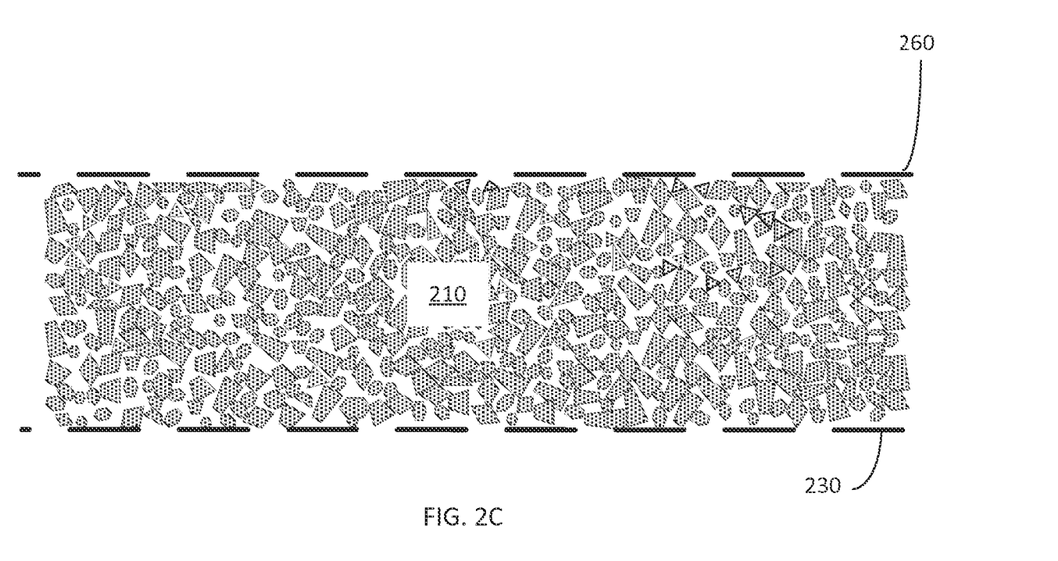
FIG. 2C provides a cross sectional drawing of an embodiment of an aerogel structure.

In another set of embodiments, a structure of adhered aerogel particles may be formed prior to insertion into an IGU. As shown in cross section in FIG. 2A, a bed of loose coated aerogel particles 210 may be placed on scrim 230 that is in turn supported by substrate 240. Substrate 240 may be a pane that forms one side of the IGU or may be a substrate that is not a part of the final IGU. Supports 250A and 250B can be used to retain the aerogel particles laterally. The supports may be made from, or coated with, a non-stick material such as PTFE. After the volume defined by substrate 240 and supports 250A and 250B is filled with coated aerogel particles, the particle bed 210 may optionally be densified. Densification may be achieved, for example, by tapping, vibrating, compressing or by placing the structure in a vacuum bag and applying vacuum. FIG. 2B illustrates the structure of FIG. 2A after an additional scrim 260 and compression top 270 have been applied. Compression top 270 and supports 250A and 250B can be configured and sized to produce an aerogel particle structure that is pre-sized to fit inside the panes of a pre-selected IGU. If substrate 240 is a pane of the IGU then compression top 270 may be a similar pane that forms the opposed side of the IGU. In other embodiments, the structure may be cut to fit a specific IGU after the adhesive has been polymerized. After any densification has been achieved, the coated particles can be adhered together to form a structure as described above, for instance, by heating. The structure can then be separated from the supports and substrates (if desired), leaving the aerogel particle structure and scrims 230 and 260, as shown in FIG. 2C. An IGU can then be produced either by sliding the structure into a pre-formed IGU or by laying the structure on a first pane and then stacking a second pane on the structure and subsequently fixing the two panes together to form an IGU using methods known to those skilled in the art.

Example

In one example, 75 g of silica aerogel particles having a particle size of 1.2-4 mm (TLD 302, hydrophobic silica aerogel available from Cabot Corp) were mixed with an aqueous acrylic polymer treatment vehicle (Acrygen 8596). The amount of polymer mixed with the aerogel was varied to achieve loadings of 10 wt % (Sample 2) and 26 wt % (Sample 3) of polymer with respect to weight of the aerogel. Sample 4 was prepared similarly but with 10% by wt polyvinyl alcohol instead of the acrylic polymer. To achieve these loadings, the polymer solution was dispersed in water at concentrations of 5% to 20% by weight. In many embodiments, the amount of polymer in water can be viscosity limited so that the dispersion remains sprayable. The aerogel particles were mixed with the polymer solution, ensuring uniform wetting of the aerogel surface with polymer. No wetting agent was used. Each sample of particles was then dried in a pan in the oven at ~50° C. for 15 minutes to drive off the excess water. The dried particles were free flowing. Aerogel coated with the polymer solution was filled in a 8"×8"×1" (W× H×t) glass panel container with nonwoven glass scrim against both the front and back glass panes. The filled panel was then heated in an oven at ~100° C. for 2 h and cooled to room temperature. The following tests were run to evaluate the mechanical and optical characteristics of the structure. Results are provided in Table 1.

Testing:
1. To evaluate the stability of the structure during transportation the glass panel filled with aerogel was clamped onto a vibration table and subjected to vibrations (15.7 m/s$^2$) for 4 hours. Before and after vibration pictures of the panel were taken to observe any settling issues. If the fill level dropped by more than 5% of the height of the column, the sample was deemed to have settled discernibly. If less than 5% of the height of the column, the sample was considered not to have settled discernibly. In some embodiments, settling may be less than 10%, less than 3% or less than 1% of the height of the column.
2. To evaluate visible light transmission each glass panel was mounted on a wooden frame and exposed to sunlight to measure percent light transmission and solar gain (ASRAE 74-1988.)
3. To evaluate thermal conductivity, each sample was evaluated at an average temperature of 37.5° C. using a Lasercomp FOX 200 HT and ASTM method C518. Thermal conductivity of the structure was measured in a polycarbonate panel and the final values were corrected to subtract the thermal conductivity of the polycarbonate.

| Sample | Settling visible after vibration? | Thermal conductivity (mW/mK) | Light transmission (%) | Solar gain (%) |
| --- | --- | --- | --- | --- |
| 1 (Control no polymer coating) | Yes | 24.7 | 41.7 | 38.3 |
| 1 (Control no polymer coating, with glass scrims) | Yes | 24.2 | 35 | 39 |
| 2 | No | 24.2 | 15 | 14 |
| 3 | No | 27.9 | 13 | 12.5 |
| 4 | No | 24.4 | 20.3 | 14.5 |

The results indicate that the structures of adhered aerogel particles eliminate settling of aerogel particles while minimally affecting thermal conductivity. Light transmission and solar gain were reduced but were well within ranges necessary for daylighting applications.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. An insulated translucent system comprising:
    a self-supporting structure of translucent aerogel particles between two opposed panes of transparent or translucent material, the structure having a thickness of at least 5 mm and a planar surface area of at least one half the surface area of one of the panes;
    an adhesive coating the aerogel particles and adhering adjacent particles together; and
    wherein the self-supporting structure is void of fibers, exhibits thermal conductivity of less than 28 mW/mK at an average temperature of 37.5 degrees Celsius and average light absorbance of less than 80% at 400, 450 and 650 nm.

2. The insulated translucent system of claim 1 wherein the self-supporting structure has a thickness of at least 1 cm.

3. The insulated translucent system of claim 1 wherein the light absorbance or any light refraction does not vary in a discernible pattern in the insulated translucent system.

4. The insulated translucent system of claim 3 wherein the adhesive is a polymer that is present at 5% to 50% by weight based on the weight of the aerogel particles.

5. The insulated translucent system of claim 1 further comprising at least one translucent scrim between the self-supporting structure of aerogel particles and one of the panes.

6. The insulated translucent system of claim 1 wherein no discernible settling of the aerogel particles occurs after shaking at 15.7 m/s$^2$ for 4 hours.

7. The insulated translucent system of claim 1, wherein the two opposed panes are glass panes and the insulated translucent system is an insulated glass unit.

8. The insulated translucent system of claim 1, wherein a difference between a refractive index of the aerogel particles and a refractive index of the adhesive is less than 50%.

9. The insulated translucent system of claim 1, wherein the refractive index of the adhesive is less than 1.8.

10. The insulated translucent system of claim 1, wherein the adhesive is selected from the group consisting of fluoropolymers, acrylics, polyurethanes, polyvinyl alcohols, polyvinyl pyrrolidones, water glass and colloidal silica.

11. The insulated translucent system of claim 1, wherein less than 30% of a pore volume of the aerogel particles is filled with the adhesive.

\* \* \* \* \*